No. 670,382. Patented Mar. 19, 1901.
J. CALDWELL.
TROLLEY WHEEL.
(Application filed June 9, 1899.)
(No Model.)

Witnesses
F. T. F. Johnson
Nellie Yates

Inventor
John Caldwell
By J. R. Nottingham
Attorney

THE NORRIS PETERS CO., PHOTO-LITHO., WASHINGTON, D. C.

UNITED STATES PATENT OFFICE.

JOHN CALDWELL, OF PROVIDENCE, RHODE ISLAND, ASSIGNOR OF TWO-THIRDS TO JOHN S. KELLOGG, OF SAME PLACE.

TROLLEY-WHEEL.

SPECIFICATION forming part of Letters Patent No. 670,382, dated March 19, 1901.

Application filed June 9, 1899. Serial No. 719,867. (No model.)

*To all whom it may concern:*

Be it known that I, JOHN CALDWELL, a citizen of the United States, residing at Providence, in the county of Providence and State of Rhode Island, have invented certain new and useful Improvements in Trolley-Wheels; and I do hereby declare the following to be a full, clear, and exact description of the invention, such as will enable others skilled in the art to which it appertains to make and use the same.

My invention relates to trolley-wheels for electric-railway systems, but has more particularly reference to the bushing for such class of wheels.

The invention consists, essentially, in providing a trolley or other wheel, either solid or sectional, with a suitable bushing, in which are seated reversely-wound wire coils which serve as a bearing for the axle and for supplying lubricant to the axle or shaft of the wheel.

The invention further consists in constructing a trolley-wheel of two outwardly-flanged disks, preferably of steel, with an intervening disk of a material which may possess greater conductivity than the two outer disks and providing such a wheel with the bushing and the lubricant-applying device; and the invention further consists in the general arrangement and combination of the several parts of the wheel, as will be hereinafter more fully described, and particularly pointed out in the claims.

The principal object of the invention is to provide a trolley or other wheel with a bearing which shall be in a measure indestructible and almost entirely free from friction and in which the lubricant is gradually fed from each end toward the center of the bearing.

Other objects of the invention will be made apparent from the further description of the device.

These objects are attained by means of the mechanism illustrated in the accompanying drawings, in which—

Figure 1:
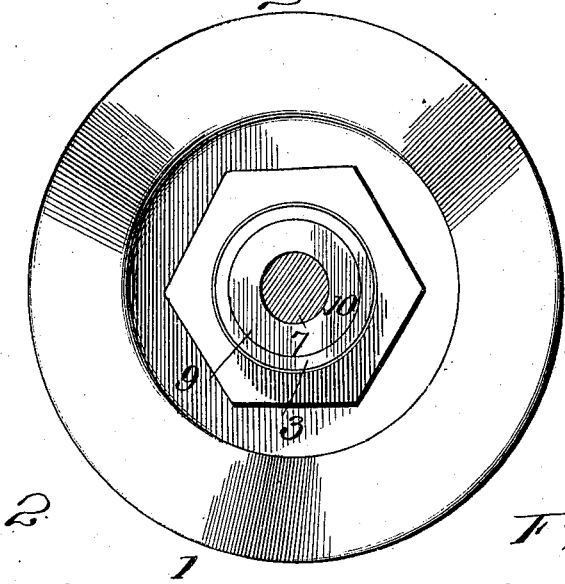
Figure 2:
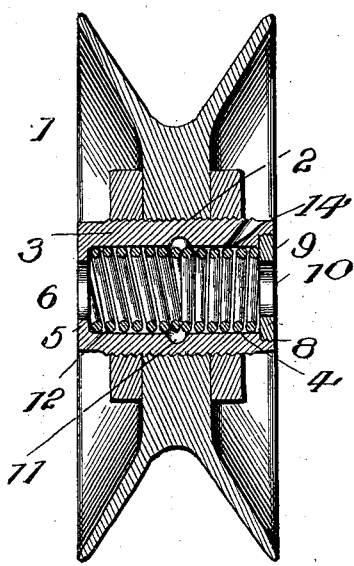
Figure 3:
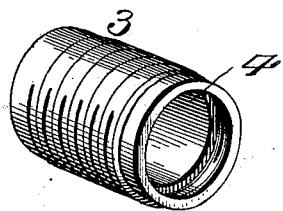

Figure 1 represents a side elevation of a trolley-wheel; Fig. 2, a transverse sectional view; Fig. 3, a perspective view of the bushing; and Fig. 4, a transverse sectional view of a modified form of trolley-wheel, showing my invention applied thereto.

In the several views of the drawings, the numeral 1 indicates a trolley-wheel of the ordinary type provided with the usual peripheral groove for the reception of the trolley-wire and with a transverse central screw-threaded bore 2, in which is seated a screw-threaded box or bushing 3. The box or bushing is provided with a cylindrical bore 4, of uniform size, which extends nearly its entire length, leaving at one end a cap 5, which is provided with a central perforation 6, through which projects one end of the axle 7. The other end of the box or bushing is slightly counterbored to form an annular recess or seat 8 for the reception of a tightly-fitted cap or collar 9, provided with a central perforation 10, through which projects the other end of the axle. The bore of the box or bushing is provided with a central annular groove or reservoir 11, and on each side of this groove is seated a wire coil 12, the coils of one running reversely to the other, so that the lubricant will be fed from each end of the bearing toward the center into the annular groove. These coils are made of case-hardened steel and form the bearing for the axle and are retained in place by the caps 5 and 9. The box or bushing is secured and maintained in proper position by screw-threaded clamping-nuts 13.

The parts are assembled in the following manner, viz: The box or bushing is screwed into the bore 2 until each end thereof is flush with the side edges of the flanges of the wheel. The nuts are then screwed upon the projecting ends of the box or bushing to securely hold it in proper position. The wire coils are inserted into the bore of the box or bushing and the cap 9 firmly forced in its seat, thus completely confining the coils within said bore.

The coils not only form an efficient and durable bearing, one in which the friction is greatly diminished, but they also form a means for gradually feeding lubricant to the axle, which is supplied through the channel 14.

Figure 4:
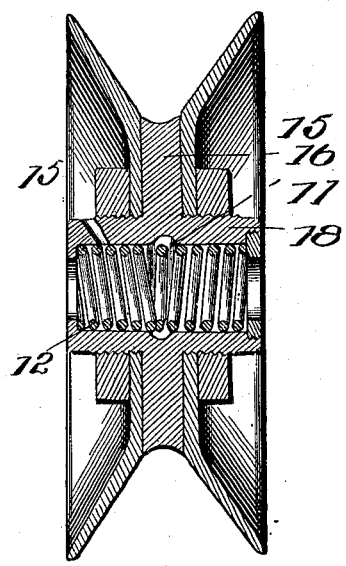

In the modification shown in Fig. 4 the wheel is composed of two outwardly-flanged disks 15, struck up out of sheet-steel, and an intermediate or central disk 16, preferably of a metal having a greater conductivity than the outer disks. The central or intermediate disk is preferably provided or formed with projecting side hubs 18, which project through central apertures in the outer disks and form the box or bushing for the wheel, being constructed externally and internally the same as the box or bushing 3. In this construction the clamping-nuts serve to hold the several disks or sections of the wheel firmly together.

It will be obvious that the central disk may be provided with a central aperture to correspond with the apertures in the outer disks, and the box or bushing secured as in the solid wheel, instead of being formed integral with the box or bushing.

A bush-bearing constructed in accordance with my invention allows of a straight and smooth-running wheel, the reversely-wound coils serving to always maintain the wheel in a true line upon its axle.

Having thus fully described my invention, what I claim as new, and desire to secure by Letters Patent, is—

1. In a trolley-wheel the combination of a hub, annular bore or chamber therein, and a central annular groove or oil-reservoir therein, of two metallic coils, wound and set in reverse directions in said chamber, and adapted to feed oil or lubricant into the annular groove or reservoir, said chamber having one end closed with a perforated cap integral with said hub, and its opposite end closed with a removable perforated cap, and a channel leading from the exterior of the hub to the interior of the said chamber for feeding oil to the coils, as set forth.

2. The combination with a trolley-wheel consisting of two outwardly-flanged metallic disks, and a central hub having a circular flange between said disks and possessing greater conductivity than the said disks, of a box or bushing consisting of an annular bore or chamber in said hub, a central annular groove or oil-reservoir therein, two metallic coils, wound and set in reverse directions, and located within said bore or chamber, and adapted to feed the oil or lubricant into the annular groove or reservoir, said box having one end closed with a perforated cap, integral with the box, the opposite end being closed with a removable perforated cap, and a channel leading from the exterior to the interior of the wheel for feeding oil to the coils, as set forth.

In testimony whereof I affix my signature in the presence of two witnesses.

JOHN CALDWELL.

Witnesses:
ROBERT W. BURBANK,
AUGUSTA S. MEREWETHER.